United States Patent
Wang et al.

(10) Patent No.: US 11,739,482 B2
(45) Date of Patent: Aug. 29, 2023

(54) CONTROL DEVICE FOR BRIDGE VORTEX-INDUCED VIBRATION

(71) Applicant: CHONGQING UNIVERSITY OF ARTS AND SCIENCES, Chongqing (CN)

(72) Inventors: Mingzhen Wang, Chongqing (CN); Lin Gao, Chongqing (CN)

(73) Assignee: Chongqing University of Arts and Sciences, Chongqing (CN)

( * ) Notice: Subject to any disclaimer, the term of this patent is extended or adjusted under 35 U.S.C. 154(b) by 354 days.

(21) Appl. No.: 17/288,885

(22) PCT Filed: Jan. 8, 2021

(86) PCT No.: PCT/CN2021/070824
§ 371 (c)(1),
(2) Date: Apr. 26, 2021

(87) PCT Pub. No.: WO2022/012001
PCT Pub. Date: Jan. 20, 2022

(65) Prior Publication Data
US 2023/0151565 A1    May 18, 2023

(30) Foreign Application Priority Data
Jul. 16, 2020  (CN) .......................... 202010683879.X

(51) Int. Cl.
*E01D 19/00* (2006.01)
*F16F 15/02* (2006.01)

(52) U.S. Cl.
CPC .............. *E01D 19/00* (2013.01); *F16F 15/02* (2013.01)

(58) Field of Classification Search
CPC .. E01D 19/00; E01D 2/00; E01D 2/02; E01D 2/04
See application file for complete search history.

(56) References Cited

U.S. PATENT DOCUMENTS

| | | | | |
|---|---|---|---|---|
| 4,450,931 A * | 5/1984 | Yamashita | ........... | G10K 11/172 181/198 |
| 5,287,578 A * | 2/1994 | Lovret | .................... | E01D 11/02 14/18 |
| 5,640,732 A * | 6/1997 | Diana | .................... | E01D 19/103 14/18 |
| 11,486,101 B1 * | 11/2022 | Liu | ........................... | E01D 2/00 |
| 2018/0112364 A1 * | 4/2018 | Starossek | ................ | E01D 11/02 |

(Continued)

*Primary Examiner* — Abigail A Risic
(74) *Attorney, Agent, or Firm* — Bochner PLLC; Andrew D. Bochner

(57) ABSTRACT

A control device for bridge vortex vibration comprising a control unit arranged at a bottom of a bridge. The control unit includes several controllers which include a base and several sliding sheets. The base is formed with a sliding groove along the length direction. A wedge block is slidably provided in the sliding groove. Each side of two sides of the base is provided with several sliding holes. Each of the sliding sheets is arranged in a corresponding one of the sliding holes. An end of each of the sliding sheets is provided with a wedge surface matched with the wedge block. A bottom of each of the sliding sheets is provided with a wind shielding structure. The object of the disclosure is to solve the technical problem of possible vortex vibration of a bridge under the condition of a low wind speed.

7 Claims, 4 Drawing Sheets

(56) References Cited

U.S. PATENT DOCUMENTS

2023/0078163 A1* 3/2023 Xu .................. F16F 7/1005
52/167.1
2023/0160159 A1* 5/2023 Xu .................. E01D 19/00
188/378

* cited by examiner

CONTROL DEVICE FOR BRIDGE VORTEX-INDUCED VIBRATION

FIELD OF THE INVENTION

The present disclosure relates to the field of bridge engineering and particularly discloses a control device for bridge vortex-induced vibration.

BACKGROUND OF THE INVENTION

Vortex-induced vibration is a wind-induced vibration of a long-span bridge at a low wind speed. From a view of fluid, any bluff body when located in fluid flowing at a constant flow rate, may alternately cause vortices off the surface of the body on both sides of the body. Karman Vortex Street effect is similar to this.

The main structure of some bridges includes a box girder. The box girder includes a top plate, a bottom plate, a web, and several clapboards. The dead weight of the box girder is light and the rigidity of the box girder is good so that the box girder is widely applied. However, the box girder has poor aerodynamic performance, and easily causes the vortex-induced vibration. The vortex-induced vibration may cause a bridge to slosh and make vehicles difficult to drive, and may even cause damages to a bridge.

SUMMARY OF THE INVENTION

In view of this, the object of some embodiments is to provide a control device for bridge vortex vibration to solve the technical problem of possible vortex-induced vibration of a bridge under the condition of a low wind speed.

In order to achieve the above object, the present disclosure provides the following technical solution.

The present disclosure discloses a control device for bridge vortex-induced vibration, including a control unit arranged at a bottom of a bridge. The control unit includes several controllers. Each of the controllers includes a base and several sliding sheets. The base is formed with a sliding groove along a length direction, a wedge block is provided in the sliding groove in a sliding mode. Each side of two sides of the base is provided with several sliding holes, each of the sliding holes is provided with a sliding sheet. An end of each of the sliding sheets is provided with wedge surfaces matched with the wedge block. A wind shielding structure is provided at a bottom of each of the sliding sheets. The wind shielding structure includes a first connecting rod, a second connecting rod, a third connecting rod and a wind shielding curtain. The first connecting rod and the second connecting rod are both hinged with a bottom of a corresponding sliding sheet. A first end of the third connecting rod is hinged with the first connecting rod and a second end of the third connecting rod is hinged with the second connecting rod. The wind shielding curtain is quadrilateral; and three sides of the wind shielding curtain are respectively arranged on the first connecting rod, the second connecting rod and the third connecting rod.

Optionally, each of two ends of the sliding groove is provided with the wedge block in a sliding mode, and the wedge block is provided with a stop block for limiting a sliding distance.

Optionally, an upper part of the base is horizontally provided with a mounting groove. The bottom of the bridge is provided with a mounting rod with a rectangular cross section, and a lower end of the mounting rod is provided with a mounting bead which is horizontally and slidably arranged in the mounting groove.

Optionally, the mounting rod includes an upper rod and a lower rod, and the upper rod is hinged with the lower rod.

Optionally, the mounting rod also includes a middle rod. An upper end of the middle rod is connected with the upper rod through a first spherical hinge and a lower end of the middle rod is connected with the lower rod through a second spherical hinge.

Optionally, a bottom of the upper rod and a top of the lower rod are both provided with a square cavity. The first spherical hinge and the second spherical hinge are provided vertically and slidably in respective square cavities, the first spherical hinge and the second spherical hinge are connected with the middle rod. The upper rod and the lower rod are fixedly connected through a connecting strip. A wall thickness of the connecting strip is smaller than that of the upper rod and the lower rod.

Optionally, a recess is arranged in a bottom of each of the sliding sheets. The first connecting rod and the second connecting rod are both hinged in the recess. The recess can accommodate the first connecting rod, the second connecting rod, and the third connecting rod.

The working principle and beneficial effects of the solution are as follows.

1. A main reason for the bridge vortex-induced vibration is that an airflow at a low wind speed gradually turns into a spiral vortex when passing through a bridge, and the vortex applies an up and down vibration force on the bridge, resulting in the bridge vortex-induced vibration. According to the solution, a controller is arranged. The controller includes the sliding sheets. When a bridge vibrates, the wedge block can slide inwards the sliding groove, then the wedge block pushes a corresponding sliding sheet out towards two sides. After the sliding sheet slides out towards two sides, the first connecting rod, the second connecting rod, and the third connecting rod are popped out under action of dead weight, and the wind shielding curtain falls down. By this time, when the vortex meets the wind shielding curtain, the airflow direction can be changed. An amplitude of the vortex-induced vibration can be immediately reduced once the airflow direction is changed. Meanwhile, due to the vortex-induced vibration of the bridge, the wedge block and the sliding sheets will move continuously, the wind shielding curtains can play a role in disturbing the airflow so that the vortex is disordered and the vortex-induced vibration is reduced.

2. When the vortex-induced vibration occurs on a bridge, the bridge will not only vibrate up and down but also bends and twists, therefore, the controller is easily stressed and thus deformed. According to the solution, the controller is connected with the bottom of the bridge through the mounting rod. The mounting rod is provided with the upper rod, the middle rod and the lower rod, and the middle rod is in spherical hinge connection with the upper rod and the lower rod, so that the whole mounting rod can move with relatively large amplitude in the vertical direction and the horizontal direction. Furthermore, the mounting rod can also move along a length direction of the base; when the bridge is twisted, the mounting rod can correspondingly move to avoid a deformation of the controller.

Other advantages, objects, and features of the present disclosure will be set forth to some extent in the subsequent description. To some extent, the other advantages, objects, and features will be apparent to those skilled in the art upon examination of the following illustration or may be learned from the practice of the disclosure. The objects and other advantages of the disclosure will be realized and obtained by the description which follows.

List of reference numbers: 1 upper rod, 2 lower rod, 3 connecting strip, 4 base, 5 mounting groove, 6 mounting bead, 7 wedge block, 8 stop block, 9 sliding sheet, 10 middle rod, 11 cavity, 12 spherical hinge, 13 spherical hinge base, 14 horizontal groove, 15 first connecting rod, 16 second connecting rod, 17 third connecting rod, 18 wind shielding curtain, 19 wedge surface, 20 recess.

DETAILED DESCRIPTION OF THE INVENTION

Further details are provided below by way of preferred embodiments.

EMBODIMENT

Figure 1:
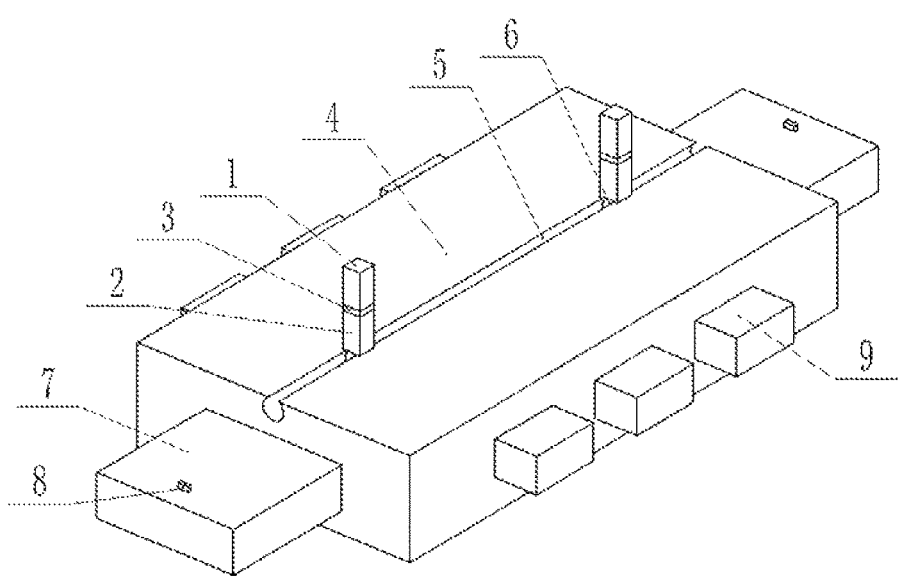
FIG. 1 is a schematic structural diagram of an embodiment.

The present disclosure discloses a control device for bridge vortex-induced vibration which includes a control unit and a mounting rod arranged at a bottom of a bridge, with reference to FIG. 1.

Figure 2:
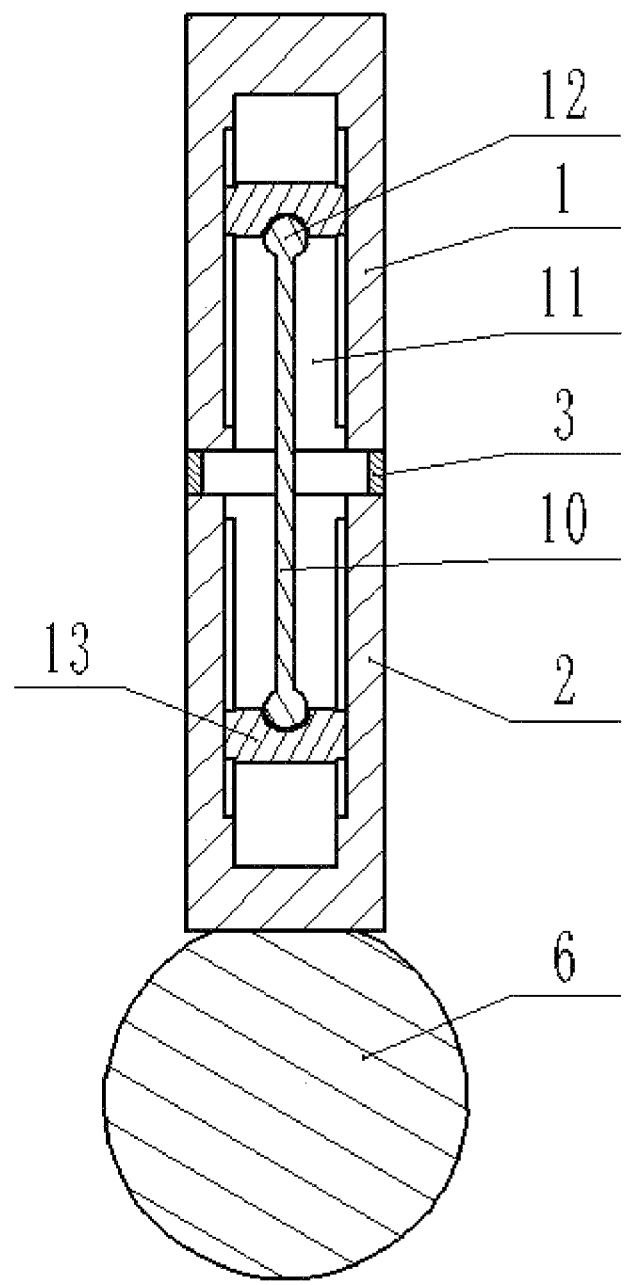
FIG. 2 is a longitudinal sectional view of a mounting rod.

With reference to FIG. 2, the mounting rod includes an upper rod 1, a middle rod 10 and a lower rod 2. The cross sections of the upper rod 1, the middle rod 10 and the lower rod 2 all are quadrate. Square cavities 11 are provided at a bottom of the upper rod 1 and at a top of the lower rod 2 respectively. Each side of two sides of an inner wall of the cavity 11 is vertically provided with a vertical groove. An upper end and a lower end of the vertical groove do not penetrate through the cavity 11. A spherical hinge base 13 is vertically and slidably provided in the vertical groove. An upper end and a lower end of the middle rod 10 are both integrally formed with a spherical hinge 12 connected with the spherical hinge base 13. The upper rod 1 and lower rod 2 are fixedly connected with each other through a connecting strip 3, and a wall thickness of the connecting strip 3 is smaller than that of the upper rod 1 and the lower rod 2. A mounting bead 6 is fixedly provided at a bottom of the lower rod 2.

Figure 3:
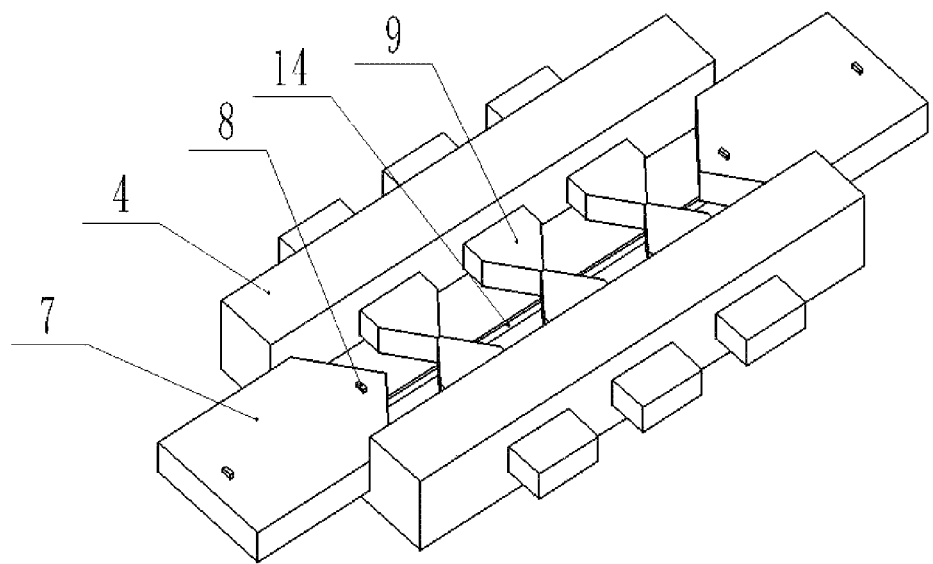
FIG. 3 is a schematic structural diagram of an interior of the base.
Figure 4:
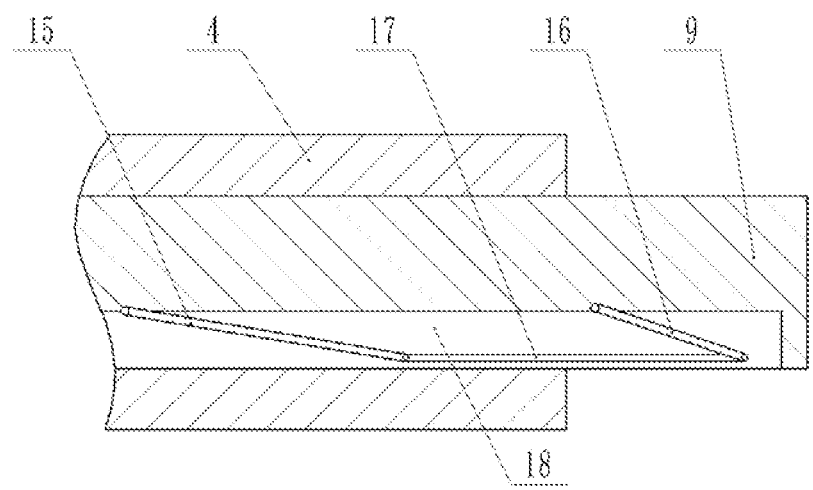
FIG. 4 is a structural cross-sectional view of a portion of the sliding sheet.
Figure 5:
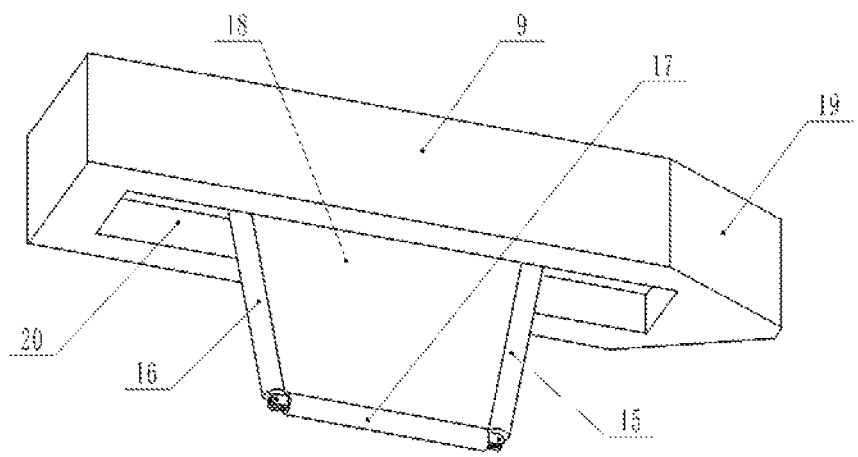
FIG. 5 is a schematic structural diagram of a sliding sheet.

With reference to FIGS. 3-5, a control unit includes several controllers, each of the controllers includes a base 4 and several sliding sheets 9. A top of the base 4 is formed with an incomplete cylindrical mounting groove 5 along a length direction of the base 4, and the mounting bead 6 is slidably arranged in the mounting groove 5. The base 4 is further formed with a sliding groove along the length direction. Each of an inner upper wall and a inner lower wall of the sliding groove is provided with a horizontal groove 14. Two ends of the horizontal groove 14 do not penetrate through the inner upper wall or the inner lower wall of the sliding groove. A wedge block 7 is slidably provided in the sliding groove. Each of an upper end and a lower end of the wedge block 7 is fixedly provided with two stop blocks 8. One of two stop blocks 8 is slidably provided in the horizontal groove 14, and another of the two stop blocks 8 is provided outside the base 4. Each of two sides of the base 4 is provided with several sliding holes. Each of the sliding holes is provided with a corresponding sliding sheet 9, an end of each of the sliding sheets 9 is provided with wedge surfaces matched with the wedge block 7. A bottom of each of the sliding sheets 9 is provided with a recess and a wind shielding structure. The wind shielding structure includes a first connecting rod 15, a second connecting rod 16, a third connecting rod 17 and a wind shielding curtain 18. The first connecting rod 15 and the second connecting rod 16 are hinged with an inner top wall of the recess. A first end of the third connecting rod 17 is hinged with the first connecting rod 15 and a second end of the third connecting rod 17 is hinged with the second connecting rod 16. The wind shielding curtain 18 is quadrilateral and three sides of the wind shielding curtain 18 are fixedly arranged on the first connecting rod 15, the second connecting rod 16 and the third connecting rod 17 respectively. The recess can accommodate the first connecting rod 15, the second connecting rod 16 and the third connecting rod 17.

The specific implementation is as follows.

When the vortex-induced vibration occurs on a bridge, the bridge will vibrate up and down and deform, such as bending and twisting, at the same time. When the bridge deforms or vibrates, the mounting rod is stressed to deform and break the connecting strip 3. After the connecting strip 3 is broken, the upper rod 1 and the lower rod 2 are not directly and physically connected with each other such that the upper rod 1 and the lower rod 2 are instantly separated. The whole controller slides downwards under the action of its dead weight, and the middle rod 10 is exposed from the cavities 11 of the upper rod 1 and the lower rod 2. Because the middle rod 10 is connected with the upper rod 1 and the lower rod 2 through the spherical hinges 12, the upper rod 1 and the whole lower rod 2 can move in a large range relative to each other to adapt to the irregular deformation of the bridge. Meanwhile, since the lower rod 2 is slidably arranged in the mounting groove 5 through the mounting bead 6, the controller can also horizontally displace relative to the lower rod 2. When the bridge vibrates and deforms, the controller shakes up, down, left and right along with the bridge. The wedge block 7 can slide into the base 4 such that a corresponding sliding sheet 9 is pushed out. After the sliding sheet 9 moves outwards, the first connecting rod 15, the second connecting rod 16 and the third connecting rod 17 in the recess automatically fall down, and at the moment, the wind shielding curtain 18 is unfolded. The conditions for generating the vortex-induced vibration are relatively harsh, which require that a vortice generated at an upper part of the bridge and a vortice generated at a lower part of the bridge are in opposite directions, to enable the bridge to vibrate and deform. The vortex vibration may disappear if a wind speed is instantly changed, a direction and a speed of the airflow are instantly changed and so on. Therefore, the wind shielding curtain 18 in the embodiment can instantly change the direction and the speed of the airflow, thereby reducing the vortex vibration.

What has been described above is merely an embodiment of the present disclosure, and common knowledge such as specific structures and characteristics well known in the art is not described in detail herein. It should be pointed out that for those skilled in the art, without departing from the structure of the present disclosure, several modifications and improvements can be made. These modifications and improvements should also be regarded as falling within the scope of the present disclosure, and these will neither affect the effect of the implementation of the present disclosure nor the practicality of the present disclosure.

What is claimed is:

1. A control device for bridge vortex-induced vibration, comprising a control unit arranged at a bottom of a bridge, wherein the control unit comprises a plurality of controllers, each of the plurality of controllers comprises a base and several sliding sheets, the base is formed with a sliding groove along a length direction, a wedge block is provided in the sliding groove in a sliding mode, each side of two sides of the base is provided with a plurality of sliding holes, each of the plurality of sliding sheets is provided in a corresponding one of the plurality of the sliding holes, an end of each of the plurality of the sliding sheets is provided with wedge surfaces matched with the wedge block; a bottom of each of the plurality of the sliding sheets is provided with a wind shielding structure; the wind shielding structure comprises a first connecting rod, a second connecting rod, a third connecting rod and a wind shielding curtain; the first connecting rod and the second connecting rod are both hinged with a bottom of a corresponding sliding sheet, a first end of the third connecting rod is hinged with the first connecting rod and a second end thereof is hinged with the second connecting rod, the wind shielding curtain is quadrilateral, and three sides of the wind shielding curtain are respectively arranged on the first connecting rod, the second connecting rod and the third connecting rod.

2. The control device for bridge vortex vibration according to claim 1, wherein each of two ends of the sliding groove is provided with the wedge block in a sliding mode, and the wedge block is provided with a stop block for limiting a sliding distance.

3. The control device for bridge vortex vibration according to claim 2, wherein an upper part of the base is horizontally provided with a mounting groove, the bottom of the bridge is provided with a mounting rod with a rectangular cross section, and a lower end of the mounting rod is provided with a mounting bead which is horizontally and slidably arranged in the mounting groove.

4. The control device for bridge vortex vibration according to claim 3, wherein the mounting rod comprises an upper rod and a lower rod, and the upper rod is hinged with the lower rod.

5. The control device for bridge vortex vibration according to claim 4, wherein the mounting rod also comprises a middle rod, and an upper end of the middle rod is connected with the upper rod through a first spherical hinge, and a lower end thereof is connected with the lower rod through a second spherical hinge.

6. The control device for bridge vortex vibration according to claim 5, wherein a bottom of the upper rod and a top of the lower rod each are provided with a square cavity, the first spherical hinge and the second spherical hinge are vertically and slidably provided in respective square cavities, the first spherical hinge and the second spherical hinge are connected with the middle rod, the upper rod and the lower rod are fixedly connected through a connecting strip, and a wall thickness of the connecting strip is smaller than that of the upper rod and the lower rod.

7. The control device for bridge vortex vibration according to claim 6, wherein the bottom of each of the plurality of sliding sheets is provided with a recess, the first connecting rod and the second connecting rod are both hinged in the recess, and the recess can accommodate the first connecting rod, the second connecting rod and the third connecting rod.

* * * * *